(12) United States Patent
Zhang et al.

(10) Patent No.: US 11,521,129 B2
(45) Date of Patent: Dec. 6, 2022

(54) PROCESSING DEVICE, ACCELERATOR, AND METHOD FOR FEDERATED LEARNING

(71) Applicant: Clustar Technology Co., Ltd., Guangdong (CN)

(72) Inventors: Long Zhang, Guangdong (CN); Wei Wang, Guangdong (CN); Shuihai Hu, Guangdong (CN)

(73) Assignee: Clustar Technology Co., Ltd., Guangdong (CN)

( * ) Notice: Subject to any disclaimer, the term of this patent is extended or adjusted under 35 U.S.C. 154(b) by 0 days.

(21) Appl. No.: 17/514,669

(22) Filed: Oct. 29, 2021

(65) Prior Publication Data
US 2022/0147873 A1 May 12, 2022

(30) Foreign Application Priority Data

Nov. 10, 2020 (CN) .......................... 202011250232.4

(51) Int. Cl.
| | | |
|---|---|---|
| *G06F 7/544* | (2006.01) | |
| *G06F 7/72* | (2006.01) | |
| *G06F 9/50* | (2006.01) | |
| *G06N 20/00* | (2019.01) | |

(52) U.S. Cl.
CPC .......... *G06N 20/00* (2019.01); *G06F 7/5443* (2013.01); *G06F 7/722* (2013.01); *G06F 7/723* (2013.01); *G06F 9/5027* (2013.01)

(58) Field of Classification Search
CPC . G06F 7/72; G06F 7/722; G06F 7/723; G06F 7/727–729; G06F 9/5027; G06F 7/5443
See application file for complete search history.

(56) References Cited

FOREIGN PATENT DOCUMENTS

| | | |
|---|---|---|
| CN | 103164187 | 6/2013 |
| CN | 108509970 | 9/2018 |
| CN | 106681691 | 1/2019 |

(Continued)

OTHER PUBLICATIONS

I. San et al., Efficient paillier cryptoprocessor for privacy-preserving data mining, Security and Communication Networks, 9:1535-1546, 2016 (Year: 2016).*

(Continued)

*Primary Examiner* — Emily E Larocque
(74) *Attorney, Agent, or Firm* — Rankin, Hill & Clark LLP

(57) ABSTRACT

A processing device for federated learning, including: a modular exponentiation module including at least one modular exponentiation engine; a pre-processing module for providing operations corresponding to a plurality of operator modes; a montgomerization module for providing montgomerization operations; a confusion calculation module for providing modular multiplication operations in montgomery space; a montgomery reduction module for providing montgomery reduction operations; and a controller for determining, according to an input operator mode, whether to enable at least two modules out of the pre-processing module, the montgomerization module, the confusion calculation module, and the montgomery reduction module, so as for cooperatively performing the input operator mode together with the modular exponentiation module.

20 Claims, 5 Drawing Sheets

(56) References Cited

FOREIGN PATENT DOCUMENTS

| | | |
|---|---|---|
| CN | 110351087 | 12/2019 |
| CN | 110865794 | 3/2020 |
| CN | 111832050 | 10/2020 |

OTHER PUBLICATIONS

B. Song et al., An RSA Encryption Hardware Algorithm using a Single DSP Block and a Single Block RAM on the FPGA, 2010 First International Conference on Networking and Computing, IEEE Computer Society, 2020 (Year: 2010).*

Z. Yang et al., FPGA-Based Hardware Accelerator of Homomorphic Encryption for Efficient Federated Learning, arXiv: 2007.10560v1 [cs.CR], Jul. 21, 2020 (Year: 2020).*

J. Tran et al., Implementing homomorphic encryption based secure feedback control, Control Engineering Practice, 97, Mar. 2020 (Year: 2020).*

Zhou Jun, research summary on security and privacy protection of federated learning, Xihua University Journal Natural Scientific Version, Jun. 30, 2020, vol. 39 Issue 4, China.

The First Office Action issued corresponding CN Application No. CN2020112502324 dated Dec. 20, 2020, 5 pages.

\* cited by examiner

PROCESSING DEVICE, ACCELERATOR, AND METHOD FOR FEDERATED LEARNING

CROSS-REFERENCE TO RELATED APPLICATIONS

The present application claims priority to allowed Chinese patent application Ser. No. CN202011250232.4, filed on Nov. 10, 2020, which has issued as CN112070222B on Jan. 29, 2021, the contents of which are incorporated by reference in their entirety.

BACKGROUND

With the development of big data analysis and artificial intelligence (AI) technologies, the demand for high-quality labeled data keeps increasing. For example, training neural networks and data mining requires massive amounts of labeled data. These labeled data often come from application data generated and accumulated in daily life business activities. Application data is often distributed among different organizations and individuals. For example, transaction data is distributed in various financial institutions, and medical diagnosis data is distributed in various medical institutions. In addition, cross-industry and cross-domain application data are often scattered, for example, social attribute data and e-commerce transaction data in the Internet domain are often controlled by different entities. For the purpose of protecting their own business interests, and in accordance with data security, user privacy protection, and different industry policies, regulations and standards, organizations or individuals that control application data are often unwilling or have no suitable means to cooperate with each other, therefore making it difficult to allow the application data respectively controlled by them to cooperate together. This dilemma in data sharing and collaboration is called the phenomenon of isolated data island. In order to solve the problem of cross-industry and cross-organization data cooperation, especially the key issues of privacy protection and data security, the concept of federated learning is proposed. Federated learning generally means that participants who own data, without sharing data resources and under the precondition of data remaining local, perform joint training of encrypted data through encryption so as to cooperatively optimize the machine learning model to achieve win-win cooperation.

Federated learning involves two important technical indicators, namely privacy security and computing performance. Regarding privacy security, the key negotiation stage of horizontal federated learning generally uses the Diffie-Hellman (DH) algorithm to implement secure delivery of the key, and uses homomorphic encryption technology such as the Paillier encryption algorithm to encrypt and share local data. Vertical federated learning usually uses RSA encryption algorithm combined with confusion calculation to obtain the intersection of participant data. In the process of joint training of network models based on shared data, parameters such as loss functions and weights are processed by homomorphic encryption technology to be involved in calculation and updates.

Accordingly, the privacy security requirements of federated learning introduce privacy-preserving computation, and involves RSA encryption algorithm, Paillier encryption algorithm, DH algorithm, DSA algorithm and ElGama algorithm, etc. These algorithms are mainly based on modular exponentiation operations, and taking into account the massive data owned by the participants of federated learning, so federated learning needs to use a large number of large integer modular multiplication operations, and relevant modulus often have a larger bit width, such as 2048 bits. These present great challenges to the computing performance of the hardware and the processing device used for federated learning. Therefore, there is a need for a processing device, accelerator, and method for federated learning which can efficiently process complicated operations.

SUMMARY

The present disclosure relates to technical fields of data processing and privacy protection, and particularly relates to a processing device, accelerator, and method for federated learning.

The present disclosure provides a processing device, accelerator, and method for federated learning. The processing device includes: a modular exponentiation module including at least one modular exponentiation engine; a pre-processing module configured for providing operations corresponding to a plurality of operator modes; a montgomerization module configured for providing montgomerization operations; a confusion calculation module configured for providing modular multiplication operations in montgomery space; a montgomery reduction module configured for providing montgomery reduction operations; and a controller. The controller is configured for: determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module. The input operator mode is one of the plurality of operator modes. Performing modular exponentiation operations by the modular exponentiation module includes: shifting bit-by-bit from a highest non-zero bit to a lowest bit of a binarized power exponent, and the modular exponentiation module performing two modular multiplication operations on a non-zero bit and one modular multiplication operation on a zero bit. Therefore, by enabling different modules and combinations according to the operator mode to be processed, it is achieved that cooperating with the modular exponentiation module having multiple parallel modular exponentiation engines to flexibly executing different modules based on the operator mode, which is beneficial to the accomplishment of supporting multiple operator modes based on modular exponentiation operations in federated learning on a single circuit, and having higher computing performance and system efficiency. In addition, by choosing to start from the highest non-zero bit, or, the highest effective bit being 1, the computing efficiency is improved. Also, by determining whether to perform a second modular multiplication operation based on whether a bit after the shifting of the binarized power exponent is 1, it is beneficial to the accomplishment of transforming modular exponentiation operations into multiple modular multiplication operations.

In accordance with a first aspect of the present disclosure, the embodiments of the present disclosure provide a processing device. The processing device includes: a modular exponentiation module including at least one modular exponentiation engine; a pre-processing module configured for providing operations corresponding to a plurality of operator modes; a montgomerization module configured for providing montgomerization operations; a confusion calculation module configured for providing modular multiplication operations in montgomery space; a montgomery reduction module configured for providing montgomery reduction operations; and a controller. The controller is configured for: determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module. The input operator mode is one of the plurality of operator modes. Performing modular exponentiation operations by the modular exponentiation module includes: shifting bit-by-bit from a highest non-zero bit to a lowest bit of a binarized power exponent, and the modular exponentiation module performing two modular multiplication operations on a non-zero bit and one modular multiplication operation on a zero bit.

With reference to the first aspect of the present disclosure, by enabling different modules and combinations according to the input operator mode, it is achieved that cooperating with the modular exponentiation module having multiple parallel modular exponentiation engines to flexibly executing different modules based on the input operator mode, which is beneficial to the accomplishment of supporting multiple operator modes based on modular exponentiation operations in federated learning on a single circuit, and having higher computing performance and system efficiency. In addition, by choosing to start from the highest non-zero bit, or, the highest effective bit being 1, the computing efficiency is improved. Also, by determining whether to perform a second modular multiplication operation based on whether a bit after the shifting of the binarized power exponent is 1, it is beneficial to the accomplishment of transforming modular exponentiation operations into multiple modular multiplication operations.

In accordance with the first aspect of the present disclosure, in a manner of implementation, the two modular multiplication operations include a first modular multiplication operation and a second modular multiplication operation, wherein the first modular multiplication operation includes performing a modular multiplication between a first modular multiplication result in montgomery space and a modulo to obtain a second modular multiplication result in montgomery space, the second modular multiplication operation includes performing a modular multiplication between the second modular multiplication result in montgomery space and a montgomery power base to obtain a third modular multiplication result in montgomery space. Therefore, it is beneficial to the accomplishment of transforming modular exponentiation operations into multiple modular multiplication operations.

In accordance with the first aspect of the present disclosure, in a manner of implementation, when the input operator mode is operations related to RSA algorithm, the controller determines not to enable the pre-processing module, the montgomerization module, the confusion calculation module, or the montgomery reduction module. Therefore, by enabling necessary modules only with respect to the input operator mode that is operations related to RSA algorithm, it is beneficial to improving the computing performance and system efficiency.

In accordance with the first aspect of the present disclosure, in a manner of implementation, the at least one modular exponentiation engine includes a plurality of parallel modular exponentiation engines, and performing the input operator mode comprises performing modular exponentiation operations through the plurality of parallel modular exponentiation engines of the modular exponentiation module. Therefore, it is achieved that different modules are flexibly executed according to operator mode, which is beneficial to the accomplishment of supporting multiple operator modes based on modular exponentiation operations in federated learning on a single circuit.

In accordance with the first aspect of the present disclosure, in a manner of implementation, when the input operator mode is operations related to Paillier encryption algorithm, the controller determines enabling the pre-processing module, the montgomerization module, the confusion calculation module, and the montgomery reduction module. Therefore, by enabling necessary modules only with respect to the input operator mode that is operations related to Paillier encryption algorithm, it is beneficial to improving the computing performance and system efficiency.

In accordance with the first aspect of the present disclosure, in a manner of implementation, performing the input operator mode includes: optimizing the Paillier encryption expression by the pre-processing module, performing modular exponentiation operations through the plurality of parallel modular exponentiation engines of the modular exponentiation module, performing montgomerization operations, through the montgomerization module, to an optimization result output by the pre-processing module, performing modular multiplication operations, through the confusion calculation module, to a modular exponentiation result output by the modular exponentiation module and a montgomery optimization result output by the montgomerization module, and performing montgomery reduction operations, through the montgomery reduction module, to a modular multiplication result output by the confusion calculation module. Therefore, it is achieved that different modules are flexibly executed according to operator mode, which is beneficial to the accomplishment of supporting multiple operator modes based on modular exponentiation operations in federated learning on a single circuit.

In accordance with the first aspect of the present disclosure, in a manner of implementation, when the input operator mode is operations related to vector dot product in Paillier encrypted state, the controller determines enabling the confusion calculation module and the montgomery reduction module. Therefore, by enabling necessary modules only with respect to the input operator mode that is operations related to vector dot product in Paillier encrypted state, it is beneficial to improving the computing performance and system efficiency.

In accordance with the first aspect of the present disclosure, in a manner of implementation, performing the input operator mode includes: performing modular exponentiation operations, through the modular exponentiation module, to two vector elements in one-to-one correspondence for the vector dot product in Paillier encrypted state, performing accumulation and multiplication, through the confusion calculation module, to a modular exponentiation result output by the modular exponentiation module, and performing montgomery reduction operations, through the montgomery reduction module, to a accumulation and multiplication result output by the confusion calculation module. Therefore, it is achieved that different modules are flexibly executed according to operator mode, which is beneficial to the accomplishment of supporting multiple operator modes based on modular exponentiation operations in federated learning on a single circuit.

In accordance with the first aspect of the present disclosure, in a manner of implementation, when the input operator mode is multiplication and addition in Paillier encrypted state, the controller determines enabling the montgomerization module, the confusion calculation module, and the montgomery reduction module. Therefore, by enabling necessary modules only with respect to the input operator mode that is multiplication and addition in Paillier encrypted state, it is beneficial to improving the computing performance and system efficiency.

In accordance with the first aspect of the present disclosure, in a manner of implementation, performing the input operator mode includes: performing montgomerization operations, through the montgomerization module, to a first parameter, performing modular exponentiation operations that use a second parameter as power base, through the plurality of parallel modular exponentiation engines of the modular exponentiation module, performing modular multiplication operations, through the confusion calculation module, to a montgomery first parameter output by the montgomerization module and a modular exponentiation result output by the modular exponentiation module, and performing montgomery reduction operations, through the montgomery reduction module, to a modular multiplication result output by the confusion calculation module. Therefore, it is achieved that different modules are flexibly executed according to operator mode, which is beneficial to the accomplishment of supporting multiple operator modes based on modular exponentiation operations in federated learning on a single circuit.

In accordance with the first aspect of the present disclosure, in a manner of implementation, the montgomerization module, the confusion calculation module, and the montgomery reduction module each includes a modular multiplication control unit and a modular multiplication calculation unit, respectively, for completing corresponding montgomerization operations, modular multiplication operations, and montgomery reduction operations through a single modular multiplication operation, respectively. Therefore, by way of the modular multiplication control unit and the modular multiplication calculation unit, corresponding operations are transformed into a single modular multiplication operation.

In accordance with the first aspect of the present disclosure, in a manner of implementation, the controller is also configured for performing bypass processing on modules that are not enabled among the pre-processing module, the montgomerization module, the confusion calculation module, and the montgomery reduction module. Therefore, by performing bypass processing, it is beneficial for supporting more operator modes.

In accordance with a second aspect of the present disclosure, the embodiments of the present disclosure provide an accelerator for privacy-preserving computation associated with federated learning. The accelerator includes a processing device. The processing device includes: a modular exponentiation module including at least one modular exponentiation engine; a pre-processing module configured for providing operations corresponding to a plurality of operator modes; a montgomerization module configured for providing montgomerization operations; a confusion calculation module configured for providing modular multiplication operations in montgomery space; a montgomery reduction module configured for providing montgomery reduction operations; and a controller. The controller is configured for: determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module. The input operator mode is one of the plurality of operator modes. Performing modular exponentiation operations by the modular exponentiation module includes: shifting bit-by-bit from a highest non-zero bit to a lowest bit of a binarized power exponent, and the modular exponentiation module performing two modular multiplication operations on a non-zero bit and one modular multiplication operation on a zero bit. Therefore, an accelerator for the federated learning having higher computing performance and system efficiency is provided.

In accordance with a third aspect of the present disclosure, the embodiments of the present disclosure provide a method for processing a computation task related to federated learning. The method includes: determining an input operator mode associated with the computation task; and determining, according to the input operator mode, whether to enable at least two modules out of a pre-processing module, a montgomerization module, a confusion calculation module, and a montgomery reduction module, so as for cooperatively performing the input operator mode together with a modular exponentiation module. The modular exponentiation module comprises at least one modular exponentiation engine. The pre-processing module is configured for providing operations corresponding to a plurality of operator modes and the input operator mode is one of the plurality of operator modes. The montgomerization module is configured for providing montgomerization operations. The confusion calculation module is configured for providing modular multiplication operations in montgomery space. The montgomery reduction module is configured for providing montgomery reduction operations. Performing modular exponentiation operations by the modular exponentiation module includes: shifting bit-by-bit from a highest non-zero bit to a lowest bit of a binarized power exponent, and the modular exponentiation module performing two modular multiplication operations on a non-zero bit and one modular multiplication operation on a zero bit.

With reference to the third aspect of the present disclosure, by enabling different modules and combinations according to the input operator mode, it is achieved that cooperating with the modular exponentiation module having multiple parallel modular exponentiation engines to flexibly executing different modules based on the input operator mode, which is beneficial to the accomplishment of supporting multiple operator modes based on modular exponentiation operations in federated learning on a single circuit, and having higher computing performance and system efficiency. In addition, by choosing to start from the highest non-zero bit, or, the highest effective bit being 1, the computing efficiency is improved. Also, by determining whether to perform a second modular multiplication operation based on whether a bit after the shifting of the binarized power exponent is 1, it is beneficial to the accomplishment of transforming modular exponentiation operations into multiple modular multiplication operations.

BRIEF DESCRIPTION OF THE DRAWINGS

The drawings are provided to illustrate example embodiments described herein and are not intended to limit the scope of the present disclosure.

DETAILED DESCRIPTION

The present disclosure provides a processing device, accelerator, and method for federated learning. The processing device includes: a modular exponentiation module including at least one modular exponentiation engine; a pre-processing module configured for providing operations corresponding to a plurality of operator modes; a montgomerization module configured for providing montgomerization operations; a confusion calculation module configured for providing modular multiplication operations in montgomery space; a montgomery reduction module configured for providing montgomery reduction operations; and a controller. The controller is configured for: determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module. The input operator mode is one of the plurality of operator modes. Performing modular exponentiation operations by the modular exponentiation module includes: shifting bit-by-bit from a highest non-zero bit to a lowest bit of a binarized power exponent, and the modular exponentiation module performing two modular multiplication operations on a non-zero bit and one modular multiplication operation on a zero bit. Therefore, by enabling different modules and combinations according to the operator mode to be processed, it is achieved that cooperating with the modular exponentiation module having multiple parallel modular exponentiation engines to flexibly executing different modules based on the operator mode, which is beneficial to the accomplishment of supporting multiple operator modes based on modular exponentiation operations in federated learning on a single circuit, and having higher computing performance and system efficiency.

Embodiments of the present disclosure may be applicable to following implementation scenarios: federated learning, privacy-preserving computation, RSA encryption algorithm, Paillier encryption algorithm, DH algorithm, DSA algorithm, and ElGama algorithm which are related to the privacy-preserving computation of federated learning, and other implementation scenarios that require a large number of large integer modular multiplication operations and modulus with larger bits, etc.

The embodiments of the present disclosure can be adjusted and improved according to specific application environments, and are not specifically limited here.

In order for those skilled in the art better understanding the present disclosure, the embodiments of the present disclosure will be described below with reference to the drawings of the present disclosure.

Figure 1:
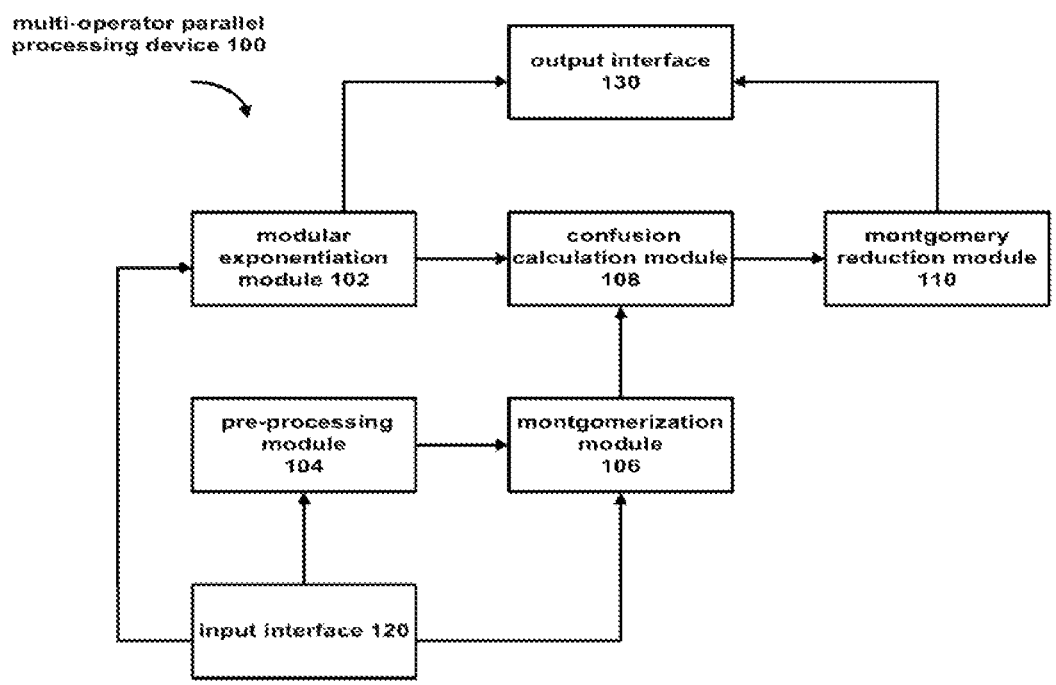
FIG. 1 is a block diagram illustrating a multi-operator parallel processing device for federated learning in accordance with the present disclosure.

With reference to FIG. 1, FIG. 1 is a block diagram illustrating a multi-operator parallel processing device for federated learning in accordance with the present disclosure. As shown in FIG. 1, multi-operator parallel processing device 100 includes multiple computing modules to execute corresponding computation tasks respectively. The multi-operator parallel processing device 100 in FIG. 1 includes modular exponentiation module 102, pre-processing module 104, montgomerization module 106, confusion calculation module 108, and montgomery reduction module 110. In addition, the multi-operator parallel processing device 100 also includes an input interface 120 and an output interface 130. FIG. 1 also shows the data transferring relationships between various modules through lines with arrows. The input interface 120 is configured to receive input data and distribute the input data according to specific situations to one or more of the modular exponentiation module 102, the pre-processing module 104, and the montgomerization module 106 connected to the input interface 120. The modular exponentiation module 102 receives the input data for processing and can directly output to the output interface 130, or can pass the processed data to the confusion calculation module 108 at the next level. The pre-processing module 104 receives the input data for processing and then passes the processed data to the montgomerization module 106 at the next level. The montgomerization module 106 can receive the upper level data from the pre-processing module 104, or can directly receive the data from the input interface 120 for processing and pass the processed data to the confusion calculation module 108 at the next level. The confusion calculation module 108 processes the received data and passes it to the montgomery reduction module 110 at the next level. The output interface 130 is connected with the modular exponentiation module 102, the confusion calculation module 108, and the montgomery reduction module 110, and may, according to specific situations, selectively use the data processed by these modules as output result. The modular exponentiation module 102 has multiple parallel modular exponentiation engines (not shown) for providing parallel accelerated processing operations. The pre-processing module 104 is for providing corresponding functional operations according to different operator modes. The montgomerization module 106 is for providing montgomerization operations to the processed result by the pre-processing module 104. The confusion calculation module 108 is for performing modular multiplication operations in montgomery space to the modular exponentiation result output by the modular exponentiation module 102 and the montgomery processed result of the pre-processing module 104 output by the montgomerization module 106. The montgomery reduction module 110 is for providing montgomery reduction operations to the output result by the confusion calculation module 108. Therefore, each module shown in FIG. 1 corresponds to different operators and respective operations, and through the connections between each other, the multi-operator parallel processing device is realized, and modular operations are realized by the Montgomery algorithm, which is beneficial to improve the computing performance of the computer.

Referring to FIG. 1, the operational mechanism of the multi-operator parallel processing device 100 will be described below with reference to specific operator modes in the federated learning implementations. There are many related algorithms in the privacy-preserving computation involved in federated learning, such as RSA algorithm, Paillier encryption algorithm, encrypted state operations, DH algorithm, DSA algorithm, ElGama algorithm, etc., all of which may utilize the computation form or operator mode shown in formula (1).

$$p=h(m)r^e \bmod N \quad (1)$$

In formula (1), h(m) means an operation corresponding to a specific operator mode, $r^e \bmod N$ means modular exponentiation operations, p means result. And r is the power base, e is the power exponent, N is the modulo, mod N means using N as the modulo to perform a modulo operation. According to the specific operator mode, h(m) has different forms of expression. On one hand, for algorithms that only include the modular exponentiation operations itself, h(m) is expressed as a constant 1, such as operations related to the RSA algorithm as shown in formula (4) below. On another hand, for implementations where data intersections are calculated by RSA, h(m) represents performing a Hash operation to data m. For the Paillier encryption algorithm, h(m) represents the optimization of the Paillier encryption expression, such as representing as 1+me, that is, it provides multiplication of large integers. Formula (1) can be mathematically divided to obtain formula (2).

$$p=h(m)r^e \bmod N = (h(m) \bmod N * r^e \bmod N) \bmod N \quad (2)$$

In formula (2), h(m) means an operation corresponding to a specific operator mode, $r^e \bmod N$ means modular exponentiation operations, p means result. And r is the power base, e is the power exponent, N is the modulo, mod N means using N as the modulo to perform a modulo operation. With reference to formula (1) and formula (2), it is clear that the part of modular exponentiation operations is required, and based on the specific form of expression of h(m), there may be different computation requirements and therefore different corresponding configurations. In consideration of limited hardware resources, pre-processing module 104 is configured to support some hardware implementations of h(m) which are common in the federated learning.

Referring to FIG. 1, the part of the modular exponentiation operations of formulas (1) and (2), i.e., $r^e \bmod N$ are processed in parallel at high speed b way of multiple parallel modular exponentiation engines of the modular exponentiation module 102. Within them, the power exponent e and the modulo N are shared among the multiple parallel processing, while the power base r is evenly distributed to every modular exponentiation engine. According to the specific forms of representation of h(m) and specific algorithm requirements, one may selectively enable modules of the multi-operator parallel processing device 100 while setting those modules that are not enabled to bypass state, so as to flexibly configure modules and combinations according to specific algorithm requirements, which is beneficial to supporting multiple operator modes based on modular exponentiation operations in federated learning. The following describes how to flexibly configure modules and combinations in combination with specific computation requirements.

For example, when operations related to the Paillier encryption algorithm are required, one may refer to the computation form shown in formula (3) for specific computation requirements.

$$p=(1+me)r^e \bmod N \quad (3)$$

In formula (3), $r^e \bmod N$ means modular exponentiation operations, p means result. The computing of formula (3) needs to enable all modules in the multi-operator parallel processing device 100. Specifically, the pre-processing module 104 needs to be enabled to optimize the Paillier encryption expression, also the modular exponentiation module 102 needs to be enabled for modular exponentiation operations, also the confusion calculation module 108 needs to be enabled for the modular multiplication operations in montgomery space, and finally the montgomery reduction module 110 needs to be enabled to perform montgomery reduction operations to the output result of the confusion calculation module 108. The input interface 120 passes the input data required to the pre-processing module 104 and the modular exponentiation module 102, respectively. In other words, the modular exponentiation module 102, the pre-processing module 104, the montgomerization module 106, the confusion calculation module 108, and the montgomery reduction module 110 are enabled.

For another example, when operations related to the RSA algorithm are required, one may refer to the computation form shown in formula (4) for specific computation requirements.

$$p=r^e \bmod N \quad (4)$$

In formula (4), h(m) shown in formula (2) is a constant 1 and therefore is not shown in formula (4), $r^e \bmod N$ means modular exponentiation operations, p means result. The operator data of the computation of formula (4) only involves performing modular exponentiation operations in modular exponentiation module 102, and the result is output directly while applying bypass processing to the confusion calculation module 108 and the montgomery reduction module 110, and the pre-processing module 104 and the montgomerization module 106 have no data input. One may use the input interface 120 to selectively pass the input data to the modular exponentiation module 102 only, while applying bypass processing to the confusion calculation module 108 and the montgomery reduction module 110, which means only enabling the modular exponentiation module 102.

For another example, when there is a need for vector dot product in Paillier encrypted state, the specific computation requirements may involve performing modular exponentiation operations, through the modular exponentiation module 102, to two vector elements in one-to-one correspondence. And the modular exponentiation result is subject to accumulation and multiplication through the confusion calculation module 108, then is subject to montgomery reduction operations through the montgomery reduction module 110. The pre-processing module 104 and the montgomerization module 106 have no data input. One may use the input interface 120 to selectively pass the input data to the modular exponentiation module 102 only, and then pass through the confusion calculation module 108 and the montgomery reduction module 110 in turn, that is, the modular exponentiation module 102, the confusion calculation module 108, and the montgomery reduction module 110 are enabled.

For another example, when there is a need for multiplication and addition in Paillier encrypted state, the specific computation requirements may refer to the computation form shown in formula (5).

$$p=r_1 * r_2^e \bmod N \quad (5)$$

In formula (5), the part of modular exponentiation operations, i.e., operations related to $r_2^e \bmod N$, are performed in the modular exponentiation module 102, and the pre-processing module 104 is bypass processed. Montgomerization operations are applied to parameter $r_1$ by the montgomerization module 106. Then in the confusion calculation module 108, the data output by the modular exponentiation module 102 and another data output by the montgomerization module 106, these two data outputs are subject to modular multiplication operations, and finally are subject to montgomery reduction operations in the montgomery reduction module 110. One may use the input interface 120 to selectively pass the input data to the modular exponentiation module 102 and the montgomerization module 106 only, thereby enabling together the modular exponentiation module 102, the montgomerization module 106, the confusion calculation module 108, and the montgomery reduction module 110.

Referring to FIG. 1 and in combination of formula (1) through formula (5), the operating mechanism of the multi-operator parallel processing device 100 can selectively pass input data to corresponding modules for processing by the input interface 120 according to required computation requirements or operator mode, and may enable different modules to handle subsequent computations while applying bypass processing to those modules that are not enabled, so as to achieve flexibly executing different modules based on the input operator mode, which is beneficial to the accomplishment of supporting multiple operator modes based on modular exponentiation operations in federated learning on a single circuit. It should be understood that the multi-operator parallel processing device 100 shown in FIG. 1 can also be understood as a federated learning system designed to support a variety of parallel acceleration circuits based on modular exponentiation operators, and can also be understood as a dedicated accelerator for federated learning. In addition, the input interface 120 and the output interface 130 may be internal components of the multi-operator parallel processing device 100 shown in FIG. 1, and may also be configured separately, that is, the multi-operator parallel processing device 100 may not include the input interface 120 and the output interface 130.

Figure 2:
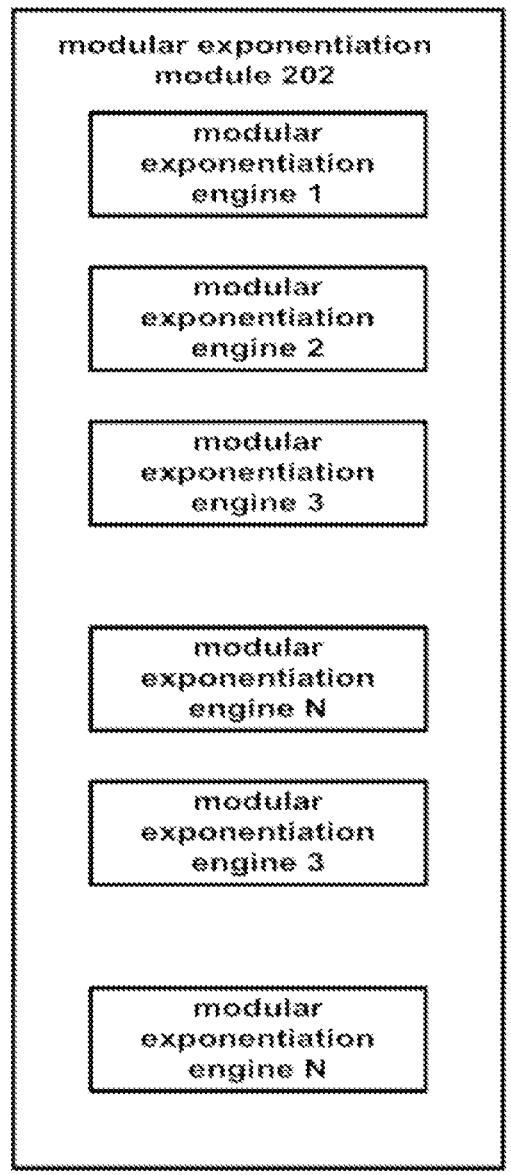
FIG. 2 is a structural diagram illustrating a modular exponentiation module of the multi-operator parallel processing device shown in FIG. 1 in accordance with the present disclosure.

With reference to FIG. 2, FIG. 2 is a structural diagram illustrating a modular exponentiation module of the multi-operator parallel processing device shown in FIG. 1 in accordance with the present disclosure. The modular exponentiation module 202 shown in FIG. 2 corresponds to the modular exponentiation module 102 of the multi-operator parallel processing device 100 shown in FIG. 1. Specifically, the modular exponentiation module 202 includes multiple parallel modular exponentiation engines, which are numbered as modular exponentiation engine 1, modular exponentiation engine 2 . . . modular exponentiation engine N. The modular exponentiation module 202 uses square multiplication and montgomery multiplication to implement modular exponentiation operations, that is, computing $r^e$ mod N by way of multiple parallel modular exponentiation engines. Among these, the power exponent e and the modulus N are shared in multiple groups of parallel processing operations, and the power base r is evenly distributed to each modular exponentiation engine.

Figure 3:
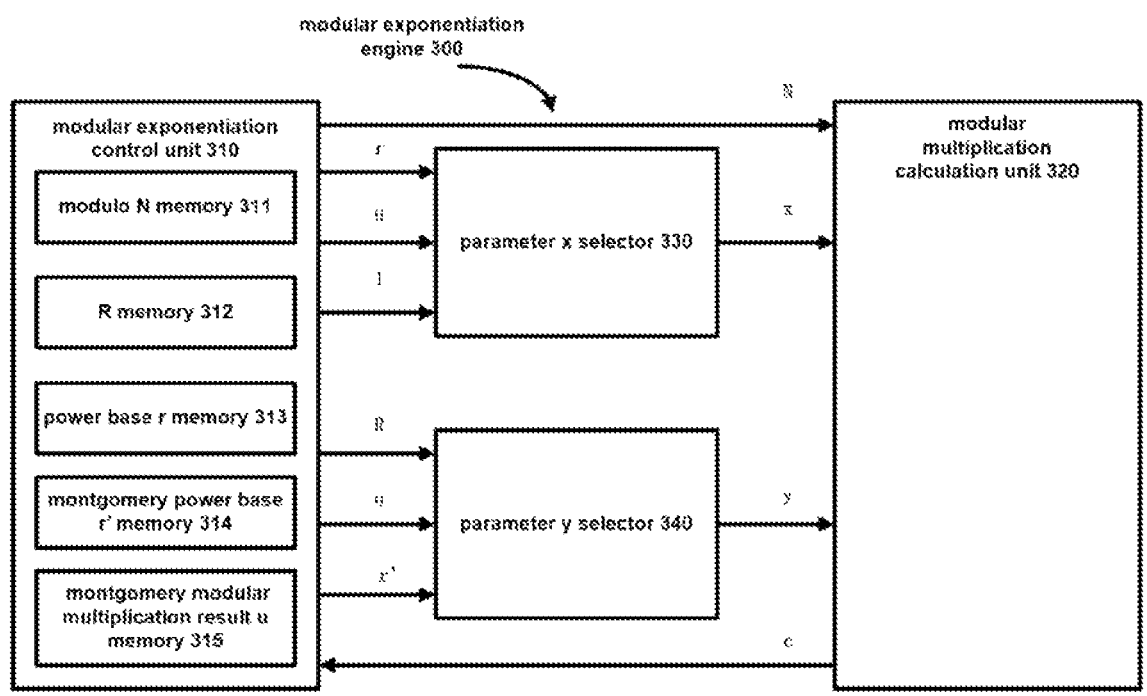
FIG. 3 is a structural diagram illustrating a modular exponentiation engine of the modular exponentiation module shown in FIG. 2 in accordance with the present disclosure.

With reference to FIG. 3, FIG. 3 is a structural diagram illustrating a modular exponentiation engine of the modular exponentiation module shown in FIG. 2 in accordance with the present disclosure. The modular exponentiation engine 300 in FIG. 3 corresponds to any one of the parallel modular exponentiation engines of the modular exponentiation module 202 in FIG. 2. The modular exponentiation engine 300 includes a modular exponentiation control unit 310 and a modular multiplication calculation unit 320. The modular exponentiation control unit 310 includes modulo N memory 311 for storing the modulo N, R memory 312 for storing the parameter R, the power base r memory 313 for storing the power base r, the montgomery power base r' memory 314 for storing the montgomery power base r', and the montgomery modular multiplication result u memory 315 for storing the montgomery modular multiplication result u, which is the modular multiplication result in montgomery space. The following describes how to implement multi-group modular exponentiation parallel computing, i.e., $r^e$ mod N, with reference to the block diagram of modular exponentiation engine 300 shown in FIG. 3.

First, one may calculate the parameter u0 through the modulo N and formula (6) and to calculate the parameter R through formula (7).

$$u0 = 2^n \bmod N \qquad (6)$$

$$R = 2^{2n} \bmod N \qquad (7)$$

In formulas (6) and (7), u0 is the initial value of montgomery modular multiplication result u in the iterative process of the square multiplication algorithm, and R is the parameter used to calculate the Montgomery transformation of the power base r. The calculated u0, R and the shared power exponent e and the modulo N are all shared with each parallel modular exponentiation engine.

The modular exponentiation engine 300 also includes a parameter x selector 330 and a parameter y selector 340. Among them, the parameter x selector 330 receives three parameters from the modular exponentiation control unit 310: a power base r stored in the power base r memory 313, a montgomery modular multiplication result u stored in the montgomery modular multiplication result u memory 315, and a positive integer 1. The parameter y selector 340 receives three parameters from the modular exponentiation control unit 310: the parameter R stored in the R memory 312, the montgomery modular multiplication result u stored in the montgomery modular multiplication result u memory 315, and the montgomery power base r' stored in the montgomery power base r memory 314. The modular exponentiation engine 300 by controlling the parameter x selector 330 and the parameter y selector 340 may selectively receive different inputs as the parameter x and the parameter y, and inputs the parameter x and the parameter y to the modular multiplication calculation unit 320. The modular multiplication calculation unit 320 calculates the modular multiplication result c according to the received parameter x and parameter y using formula (8).

$$c = x \, y \bmod N \qquad (8)$$

In formula (8), parameter x is the input selected by the parameter x selector 330, parameter y is the input selected by the parameter y selector 340, N is the modulo, and c is the result of performing a single modular multiplication operation the modular multiplication calculation unit 320. The modular exponentiation control unit 310 passes the modulo N to the modular multiplication calculation unit 320, and the modular multiplication calculation unit 320 passes the calculation result c to the modular exponentiation control unit 310. Therefore, by setting the parameter x selector 330 and the parameter y selector 340 to receive and select different parameter combinations, respectively, it is beneficial to improve the computation efficiency and flexibility. The control process will be described below with reference to FIG. 4.

Figure 4:
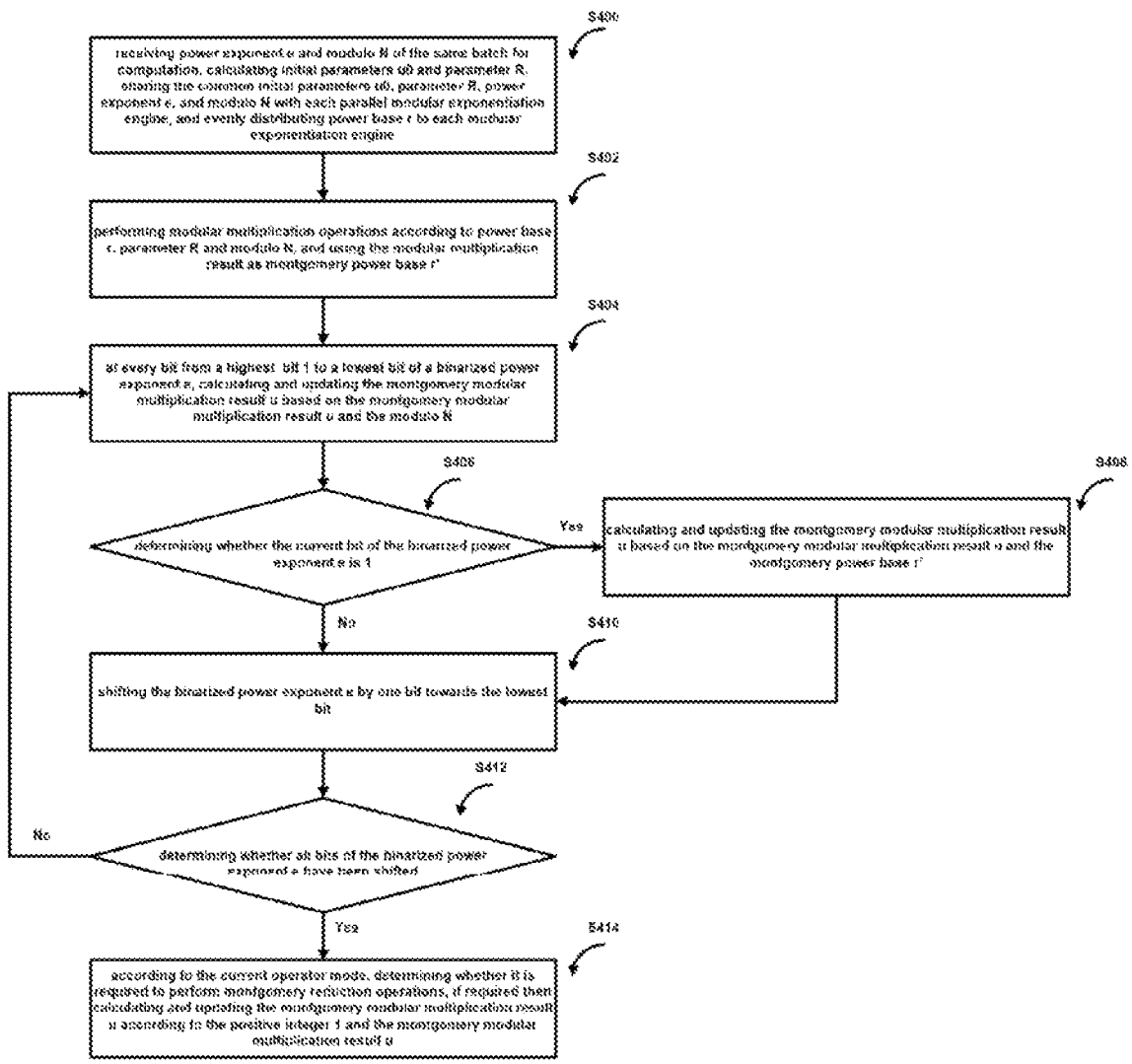
FIG. 4 is a flowchart diagram illustrating modular exponentiation engine shown in FIG. 3 performs modular exponentiation operations in accordance with the present disclosure.

Referring to FIG. 3 and FIG. 4, FIG. 4 is a flowchart diagram illustrating modular exponentiation engine shown in FIG. 3 performs modular exponentiation operations in accordance with the present disclosure. The method shown in FIG. 4 includes the following steps.

Step S400: receiving power exponent e and modulo N of the same batch for computation, calculating initial parameters u0 and parameter R, sharing the common initial parameters u0, parameter R, power exponent e, and modulo N with each parallel modular exponentiation engine, and evenly distributing power base r to each modular exponentiation engine.

Specifically, the calculation of the initial parameter u0 and the parameter R may refer to the above formulas (6) and (7). With respect to each parameter of the same batch for computation, that is, each parameter used for parallel processing of $r^e$ mod N, the initial parameter u0, parameter R, power exponent e, and modulo N are shared, and the power base r can be different, and the power base r is evenly distributed to various modular exponentiation engines.

Step S402: performing modular multiplication operations according to power base r, parameter R and modulo N, and using the modular multiplication result as montgomery power base r'.

Specifically, the parameter x selector 330 shown in FIG. 3 selects to receive the power base r stored in the power base r memory 313 as the parameter x, and the parameter y selector 340 shown in FIG. 3 selects to receive the parameter R stored in the R memory 312, and the selected power base r and parameter R are passed to the modular multiplication calculation unit 320 and the modular multiplication result c is calculated according to formula (8), then the modular multiplication result c is passed to the modular exponentiation control unit 310 and is written into the montgomery power base r' memory 314 to update the stored montgomery power base r'.

Step S404: at every bit from a highest bit 1 to a lowest bit of a binarized power exponent e, calculating and updating the montgomery modular multiplication result u based on the montgomery modular multiplication result u and the modulo N.

Specifically, the power exponent e is converted into binary. It involves shifting bit-by-bit from the highest bit 1 of the binarized power exponent e to the lowest bit, and repeating step S404 through step S408 for each bit. The binarized power exponent e can be expressed as a series of numbers consisting of 0 and 1, in which the highest bit 1 is the highest valid bit. By choosing to start from the highest bit 1 as the valid bit, the computation efficiency is greatly improved. In every cyclic calculation of the shifting bit-by-bit from the highest bit 1 to the lowest bit, a single modular multiplication operation is always performed, and the montgomery modular multiplication result u is passed as the parameter x and the parameter y to the modular multiplication calculation unit 320 and the modular multiplication result c is calculated according to formula (8), and the modular multiplication result c is passed to the modular exponentiation control unit 310 and written into the montgomery modular multiplication result u memory 315 to update the stored montgomery modular multiplication result u. In the first round of the cyclic calculation, that is, at the highest bit 1 as the valid bit, the initial parameter u0 is used as the parameter x and the parameter y to calculate the modular multiplication result c.

Step S406: determining whether the current bit of the binarized power exponent e is 1, if the current bit is 1, go to step S408, and if the current bit is 0, go to step S410.

Specifically, whether to perform a second modular multiplication operation is determined based on whether the current bit after the shifting of the binarized power exponent e is 1. If the current bit is 1, then step S408 is executed, and if the current bit is 0, then step S410 is executed.

Step S408: calculating and updating the montgomery modular multiplication result u based on the montgomery modular multiplication result u and the montgomery power base r.

Specifically, the montgomery modular multiplication result u as parameter x and the montgomery power base r' as parameter y are respectively passed to the modular multiplication calculation unit 320 and the modular multiplication result c is calculated according to formula (8), and then the modular multiplication result c is passed to the modular exponentiation control unit 310 and written into the montgomery modular multiplication result u memory 315 to update the stored montgomery modular multiplication result u.

Step S410: shifting the binarized power exponent e by one bit towards the lowest bit.

As such, it states shifting bit-by-bit from the highest bit 1 to the lowest bit of the binarized power exponent e, and performing a single modular multiplication operation at every bit and updating the montgomery modular multiplication result u, and determining whether to perform a second modular multiplication operation and update again the montgomery modular multiplication result u based on whether the current bit is 1.

Step S412: determining whether all bits of the binarized power exponent e have been shifted, if all bits have been shifted then go to step S414, and if there are still bits that have not been shifted, then go to step S404.

Therefore, by performing step S404 through step S412 iteratively, the binarized power exponent e can be shifted bit by bit until all bits have been shifted, that is, it has been shifted to the lowest bit. In addition, it states performing twice or a single modular multiplication operation(s) for each bit according to whether its value is 1 or 0, that is, determining, after step S406, whether to perform step S408 followed by step S410 or skipping step S408 to perform step S410.

Step S414: according to the current operator mode, determining whether it is required to perform montgomery reduction operations, if required then calculating and updating the montgomery modular multiplication result u according to the positive integer 1 and the montgomery modular multiplication result u.

Specifically, the positive integer 1 is used as the parameter x, and the montgomery modular multiplication result u is used as the parameter y, which are passed to the modular exponentiation control unit 310 and written into the montgomery modular multiplication result u memory 315 to update the stored montgomery modular multiplication result u.

With reference to step S402 and step S414, performing the montgomerization operation on the power base r and performing the montgomery reduction operation on the montgomery modular multiplication result u can both be implemented by a single modular multiplication. After the computing of the modular exponentiation engine 300 is completed, the next modular power can be calculated, and the calculation results output by the modular exponentiation engine 300 are consolidated and output serially to the modular exponentiation module. Therefore, by way of square multiplication and montgomery multiplication, by converting modular exponentiation operations into multiple modular multiplication operations, by shifting bit-by-bit from the highest bit 1 of the binarized power exponent e to the lowest bit, and at each bit, based on whether its value is 1 or 0, performing twice or a single modular multiplication operation(s) respectively, and by selective controlling the input parameter x and parameter y of each modular multiplication operation, and by updating the montgomery modular multiplication result u with the modular multiplication result, it is achieved that efficient modular exponentiation operations may be processed by multiple parallel modular exponentiation engines. Furthermore, modular exponentiation operations can be implemented based on square multiplication calculation in montgomery space and large number modular multiplication operations in montgomery space, such that the high parallel computing and pipeline characteristics of FPGA can be used to improve the overall computing power. In addition, it is possible to avoid direct modular operations on large integers, and replace them with multiplication, addition, and shift operations, thereby reducing computational complexity and improving computational efficiency. In addition, when utilizing implementations based on large number modular multiplication operations in montgomery space, one can configure bit width, pipeline stages and/or cycle times, such that in consideration of FPGA resources, device levels, pipeline stages, and main frequency factors, one can adjust the bit width, the number of pipeline stages, and/or the number of cycles to achieve the best performance improvement ratio.

Figure 5:
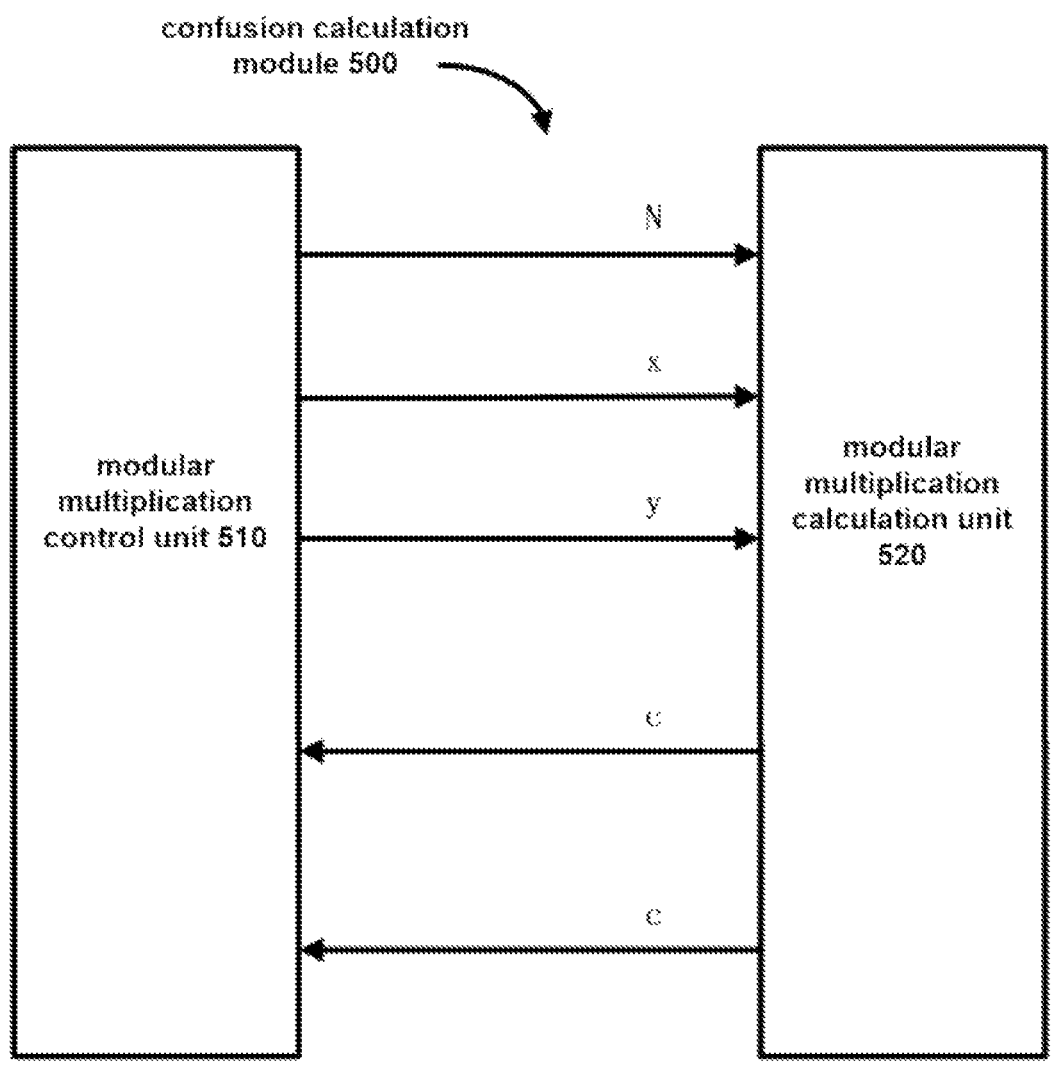
FIG. 5 is a structural diagram illustrating a confusion calculation module of the multi-operator parallel processing device shown in FIG. 1 in accordance with the present disclosure.

With reference to FIG. 5, FIG. 5 is a structural diagram illustrating a confusion calculation module of the multi-operator parallel processing device shown in FIG. 1 in accordance with the present disclosure. The confusion calculation module 500 shown in FIG. 5 corresponds to the confusion calculation module 108 in the multi-operator parallel processing device 100 shown in FIG. 1. The confusion calculation module 500 includes a modular multiplication control unit 510 and a modular multiplication calculation unit 520. The modular multiplication control unit 510 inputs the parameter x1, the parameter y1, and the modulo N to the modular multiplication calculation unit 520 to calculate the modular multiplication result c. The modular multiplication control unit 510 includes a montgomerization result memory, a modular exponentiation result memory, a modulo N memory, and a confusion calculation result memory. The parameter x1 is fixed as the modular exponentiation result stored in the modular exponentiation result memory. The parameter y1 can be the montgomerization result stored in the corresponding montgomerization result memory or the modular exponentiation result stored in the modular exponentiation result memory depending on the operator mode. For example, when the operator mode is RSA-based intersection processing, the parameter y1 corresponds to the montgomerization result memory. For another example, when the operator mode is vector dot product in Paillier encrypted state, the parameter y1 corresponds to the modular exponentiation result memory. The modular multiplication result c calculated by the modular multiplication calculation unit 520 is passed to the modular multiplication control unit 510 and written into the confusion calculation result memory. The confusion calculation module 500 also includes a bypass processing circuit (not shown), which can be used for bypass processing. For example, when the operator mode is the ElGama algorithm, the confusion calculation module 500 can be bypass processed through the bypass processing circuit.

Referring to FIG. 1 and FIG. 5, in some exemplary embodiments, the montgomerization module 106 in the multi-operator parallel processing device 100 shown in FIG. 1 can convert montgomerization into a modular multiplication operation and it may be achieved by way of similar structure to the confusion calculation module 500 shown in FIG. 5. Specifically, the parameter x1 can be set to the parameter R calculated by formula (7), and the parameter y1 can be set to h(m) corresponding to the specific operator mode. The montgomerization module 106 includes a modular multiplication control unit and a modular multiplication calculation unit. The modular multiplication control unit contains h(m) memory, R memory, N memory and result memory. It is stated that selecting parameter x1 to be R and parameter y1 to h(m), and controlling to read parameter R from R memory and h(m) from h(m) memory, and passing them to interfaces of x1 and y1 respectively of the modular multiplication calculation unit; finally writing the result returned by the modular multiplication calculation unit to the result memory.

Referring to FIG. 1 and FIG. 5, in some exemplary embodiments, the montgomery reduction module 110 in the multi-operator parallel processing device 100 shown in FIG. 1 can also convert montgomerization into a modular multiplication operation and it may be achieved by way of similar structure to the confusion calculation module 500 shown in FIG. 5. Specifically, the parameter x1 can be set to montgomery modular multiplication result u, and the parameter y1 can be set to a positive integer 1. The montgomery reduction module 110 includes a confusion calculation result memory, a modulo N memory and a result memory. It is stated that selecting the parameter x1 as the confusion calculation result and the parameter y1 as 1, and controlling to fetching data from the confusion calculation result memory to be sent to the x1 of the modular multiplication calculation unit, and sending the constant 1 to y1 of the modular multiplication calculation unit; finally writing the result returned by the modular multiplication calculation unit to the result memory.

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array (FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A processing device for federated learning implemented by a field programmable gate array (FPGA), the FPGA being programmed to perform functions of a plurality of modules of the processing device, the plurality of modules comprising:
    a modular exponentiation module comprising at least one modular exponentiation engine and configured for performing modular exponentiation operations using the at least one modular exponentiation engine;
    a pre-processing module configured for providing operations corresponding to a plurality of operator modes;
    a montgomerization module configured for providing montgomerization operations;
    a confusion calculation module configured for providing modular multiplication operations in montgomery space;
    a montgomery reduction module configured for providing montgomery reduction operations; and
    wherein the FPGA is further programmed for performing:
    determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module,
    wherein the input operator mode is one of the plurality of operator modes and each of the plurality of operator modes is associated with accelerated computing of one or more algorithms related to federated learning implementations,
    wherein performing modular exponentiation operations of the modular exponentiation module comprises: shifting bit-by-bit from a highest non-zero bit to a lowest bit of a binarized power exponent, and the modular exponentiation module performing two modular multiplication operations on a non-zero bit and one modular multiplication operation on a zero bit.

2. The processing device according to claim 1, the two modular multiplication operations include a first modular multiplication operation and a second modular multiplication operation, wherein the first modular multiplication operation includes performing a modular multiplication between a first modular multiplication result in montgomery space and a modulo to obtain a second modular multiplication result in montgomery space, the second modular multiplication operation includes performing a modular multiplication between the second modular multiplication result in montgomery space and a montgomery power base to obtain a third modular multiplication result in montgomery space.

3. The processing device according to claim 1, when the input operator mode is operations related to RSA algorithm, the integrated circuit determines not to enable the pre-processing module, the montgomerization module, the confusion calculation module, or the montgomery reduction module.

4. The processing device according to claim 3, the at least one modular exponentiation engine includes a plurality of parallel modular exponentiation engines, and performing the input operator mode comprises performing modular exponentiation operations of the modular exponentiation module using the plurality of parallel modular exponentiation engines of the modular exponentiation module.

5. The processing device according to claim 1, when the input operator mode is operations related to Paillier encryption algorithm, the integrated circuit determines enabling the pre-processing module, the montgomerization module, the confusion calculation module, and the montgomery reduction module.

6. The processing device according to claim 5, the at least one modular exponentiation engine includes a plurality of parallel modular exponentiation engines, and performing the input operator mode comprises:
    optimizing a Paillier encryption expression by the pre-processing module, performing modular exponentiation operations of the modular exponentiation module using the plurality of parallel modular exponentiation engines of the modular exponentiation module,
    performing montgomerization operations, using the montgomerization module, to an optimization result output by the pre-processing module,
    performing modular multiplication operations, using the confusion calculation module, to a modular exponentiation result output by the modular exponentiation module and a montgomery optimization result output by the montgomerization module, and
    performing montgomery reduction operations, using the montgomery reduction module, to a modular multiplication result output by the confusion calculation module.

7. The processing device according to claim 1, when the input operator mode is operations related to vector dot product in Paillier encrypted state, the integrated circuit determines enabling the confusion calculation module and the montgomery reduction module.

8. The processing device according to claim 7, performing the input operator mode comprises:
    performing modular exponentiation operations of the modular exponentiation module, using the modular exponentiation module, to two vector elements in one-to-one correspondence for the vector dot product in Paillier encrypted state, performing accumulation and multiplication, using the confusion calculation module, to a modular exponentiation result output by the modular exponentiation module, and performing montgomery reduction operations, using the montgomery reduction module, to a accumulation and multiplication result output by the confusion calculation module.

9. The processing device according to claim 1, when the input operator mode is multiplication and addition in Paillier encrypted state, the integrated circuit determines enabling the montgomerization module, the confusion calculation module, and the montgomery reduction module.

10. The processing device according to claim 9, the at least one modular exponentiation engine includes a plurality of parallel modular exponentiation engines, and performing the input operator mode comprises:

performing montgomerization operations, using the montgomerization module, to a first parameter, performing modular exponentiation operations that use a second parameter as power base, using the plurality of parallel modular exponentiation engines of the modular exponentiation module, performing modular multiplication operations, using the confusion calculation module, to a montgomery first parameter output by the montgomerization module and a modular exponentiation result output by the modular exponentiation module, and performing montgomery reduction operations, using the montgomery reduction module, to a modular multiplication result output by the confusion calculation module.

11. The processing device according to claim 1, the montgomerization module, the confusion calculation module, and the montgomery reduction module each includes a modular multiplication control unit and a modular multiplication calculation unit, respectively, for completing corresponding montgomerization operations, modular multiplication operations, and montgomery reduction operations using a single modular multiplication operation, respectively.

12. The processing device according to claim 1, the integrated circuit is also configured for performing bypass processing on modules that are not enabled among the pre-processing module, the montgomerization module, the confusion calculation module, and the montgomery reduction module.

13. An accelerator for privacy-preserving computation associated with federated learning, the accelerator comprising a processing device implemented by a filed programmable gate array (FPGA), the FPGA being programmed to perform functions of a plurality of modules of the processing device, the plurality of modules comprises:

a modular exponentiation module comprising at least one modular exponentiation engine and configured for performing modular exponentiation operations using the at least one modular exponentiation engine;

a pre-processing module configured for providing operations corresponding to a plurality of operator modes;

a montgomerization module configured for providing montgomerization operations;

a confusion calculation module configured for providing modular multiplication operations in montgomery space;

a montgomery reduction module configured for providing montgomery reduction operations; and wherein the FPGA is further programmed for performing:

determining, according to an input operator mode, whether to enable at least two modules out of the pre-processing module, the montgomerization module, the confusion calculation module, and the montgomery reduction module, so as for cooperatively performing the input operator mode together with the at least one modular exponentiation engine of the modular exponentiation module, wherein the input operator mode is one of the plurality of operator modes and each of the plurality of operator modes is associated with accelerated computing of one or more algorithms related to federated learning implementations, wherein performing modular exponentiation operations of the modular exponentiation module comprises: shifting bit-by-bit from a highest non-zero bit to a lowest bit of a binarized power exponent, and the modular exponentiation module performing two modular multiplication operations on a non-zero bit and one modular multiplication operation on a zero bit.

14. A method for processing a computation task related to federated learning, implemented by an integrated circuit, comprising:

determining an input operator mode associated with the computation task; and determining, according to the input operator mode, whether to enable at least two modules out of a pre-processing module, a montgomerization module, a confusion calculation module, and a montgomery reduction module, so as for cooperatively performing the input operator mode together with a modular exponentiation module, wherein the modular exponentiation module comprises at least one modular exponentiation engine and is configured for performing modular exponentiation operations using the at least one modular exponentiation engine, wherein the pre-processing module is configured for providing operations corresponding to a plurality of operator modes and the input operator mode is one of the plurality of operator modes, and each of the plurality of operator modes is associated with accelerated computing of one or more algorithms related to federated learning implementations, wherein the montgomerization module is configured for providing montgomerization operations, wherein the confusion calculation module is configured for providing modular multiplication operations in montgomery space, wherein the montgomery reduction module is configured for providing montgomery reduction operations, wherein the integrated circuit is configured for performing the steps of the modular exponentiation module, the pre-processing module, the montgomerization module, the confusion calculation module, and the montgomery reduction module, wherein performing modular exponentiation operations of the modular exponentiation module comprises: shifting bit-by-bit from a highest non-zero bit to a lowest bit of a binarized power exponent, and the modular exponentiation module performing two modular multiplication operations on a non-zero bit and one modular multiplication operation on a zero bit.

15. The method according to claim 14, the two modular multiplication operations include a first modular multiplication operation and a second modular multiplication operation, wherein the first modular multiplication operation includes performing a modular multiplication between a first modular multiplication result in montgomery space and a modulo to obtain a second modular multiplication result in montgomery space, the second modular multiplication operation includes performing a modular multiplication between the second modular multiplication result in montgomery space and a montgomery power base to obtain a third modular multiplication result in montgomery space.

16. The method according to claim 14, further comprising: when the input operator mode is operations related to RSA algorithm, determining not to enable the pre-processing module, the montgomerization module, the confusion calculation module, or the montgomery reduction module.

17. The method according to claim 14, further comprising: when the input operator mode is operations related to Paillier encryption algorithm, determining enabling the pre-processing module, the montgomerization module, the confusion calculation module, and the montgomery reduction module.

18. The method according to claim 14, further comprising: when the input operator mode is operations related to vector dot product in Paillier encrypted state, determining enabling the confusion calculation module and the montgomery reduction module.

19. The method according to claim 14, further comprising: when the input operator mode is multiplication and addition in Paillier encrypted state, determining enabling the montgomerization module, the confusion calculation module, and the montgomery reduction module.

20. The method according to claim 14, further comprising: performing bypass processing on modules that are not enabled among the pre-processing module, the montgomerization module, the confusion calculation module, and the montgomery reduction module.

* * * * *